(12) United States Patent
Roosen et al.

(10) Patent No.: US 7,609,384 B2
(45) Date of Patent: Oct. 27, 2009

(54) DEVICE FOR GENERATING A CARRIER IN AN INTERFEROGRAM

(75) Inventors: Gerald Roosen, La Celles-les-Bordes (FR); Gilles Pauliat, Les Ulis (FR)

(73) Assignees: Centre National de la Recherche Scientifique-CNRS (FR); Universite Paris-SUD (FR)

( * ) Notice: Subject to any disclaimer, the term of this patent is extended or adjusted under 35 U.S.C. 154(b) by 102 days.

(21) Appl. No.: 10/547,966

(22) PCT Filed: Mar. 10, 2004

(86) PCT No.: PCT/FR2004/000571

§ 371 (c)(1),
(2), (4) Date: Oct. 31, 2005

(87) PCT Pub. No.: WO2004/083793

PCT Pub. Date: Sep. 30, 2004

(65) Prior Publication Data

US 2006/0152732 A1 Jul. 13, 2006

(30) Foreign Application Priority Data

Mar. 11, 2003 (FR) .................................. 03 03010

(51) Int. Cl.
*G01B 9/021* (2006.01)
(52) U.S. Cl. .................................................... 356/457
(58) Field of Classification Search ......... 356/457–458, 356/484, 489, 495
See application file for complete search history.

(56) References Cited

U.S. PATENT DOCUMENTS

| | | | | |
|---|---|---|---|---|
| 3,828,126 A | * | 8/1974 | Ramsey, Jr. | 348/40 |
| 4,428,675 A | | 1/1984 | Witherow | |
| 4,602,844 A | * | 7/1986 | Sirat et al. | 359/30 |
| 5,621,714 A | * | 4/1997 | Kobayashi et al. | 369/110.03 |
| 6,262,818 B1 | * | 7/2001 | Cuche et al. | 359/9 |
| 6,288,986 B1 | * | 9/2001 | McDonald et al. | 369/44.23 |
| 6,304,330 B1 | * | 10/2001 | Millerd et al. | 356/521 |
| 7,148,969 B2 | * | 12/2006 | Thomas et al. | 356/484 |
| 7,209,239 B2 | * | 4/2007 | Hwang et al. | 356/495 |

FOREIGN PATENT DOCUMENTS

FR  2 646 251 A  10/1990

OTHER PUBLICATIONS

C. Quan et al., *Application of the holographic carrier fringe and FFT technique for deformation measurement*, Optics and Laser Technology, Elsevier Science Publishers BV, Amsterdam, the Netherlands, vol. 28, No, 1, Feb. 1, 1996, pp. 7-13.

* cited by examiner

*Primary Examiner*—Gregory J Toatley, Jr.
*Assistant Examiner*—Scott M Richey
(74) *Attorney, Agent, or Firm*—DLA Piper LLP (US)

(57) ABSTRACT

A process for generating a carrier in an interferogram in interferometry device either of the "real-time holographic interferometry" type or of the "double-exposure holographic interferometry" type, including recording a first wave front on a hologram, the first wave front coming from an object; generating a second wave front, in which two wave fronts are superimposed orthogonally polarizing said first and second wave fronts, either naturally or by a modification stage; and passing the orthogonally polarized two wave fronts through a birefringent crystal, a polarizer and a detector to make the two wave fronts interfere.

10 Claims, 2 Drawing Sheets

DEVICE FOR GENERATING A CARRIER IN AN INTERFEROGRAM

RELATED APPLICATIONS

This is a §371 of International Application No. PCT/FR2004/000571, with an international filing date of Mar. 10, 2004 (WO 2004/083793, published Sep. 30, 2004), which is based on French Patent Application No. 03/03010, filed Mar. 11, 2003.

1. Field of the Invention

This invention relates to the area of interferograms, that is, to the recording of an interference figure produced by the superpositioning of two waves. It concerns, in particular, but not exclusively, creation or obtention of a carrier in interferogram systems in which a carrier is introduced for studying and analyzing shifts of the object observed. More particularly, the invention relates to the introduction of a carrier in interferograms of the type "real-time holographic interferometry" or "double-exposure holographic interferometry".

2. Background

Interferograms are used to measure, among other things, minute deformations in structures.

Holography, a technique used to obtain interferograms, is a method of recording by interference between two beams of coherent light. The first of these beams originates from the light diffused or transmitted by the object. The second beam serves as a reference. The two beams interfere on the holographic support, where they record a hologram. The subsequent readback/playback of the hologram by the reference beam reconstructs the wave front of the first beam as it was during the recording.

In holographic interferometry, which is well known in the art, called "in real time", two wave fronts are compared at instant t1:

A wave front recorded previously on the hologram at instant t0 and restored by readback of the hologram by a reference beam. This wave front corresponds to the image of the object as it was at instant t0.

The wave front coming from the object and transmitted by the hologram.

These two wave fronts interfere on the detector, e.g., a camera focused on the object, thus producing an interferogram.

In holographic interferometry, which is well known in the art, called "double exposure", two wave fronts are compared at instant t2:

A wave front previously recorded on the hologram at instant t0 and restored by readback of the hologram by a first reference beam. This wave front corresponds to the image of the object as it was at instant t0.

A second wave front previously recorded on the hologram at instant t1 and restored by readback of the hologram by a second reference beam. This wave front corresponds to the image of the object as it was at instant t1.

These two wave fronts interfere on the detector, e.g., a camera focused on the object, thus producing an interferogram.

Whether it is in "real-time" or "double-exposure" interferometry, an analysis of the interferogram allows a return to the shifts undergone by the surface of the object between the two instants t0 and t1 of the measuring.

There are two techniques for analyzing interferograms that allow a return to the phase difference between the two wave fronts. The first technique concerns the techniques of phase shift that necessitate the acquisition of several interferograms. The second technique requires only one single interferogram for return to the variation in phase. In this instance, for the analysis with a single interferogram a carrier frequency or simply called (carrier) must be introduced onto the interferogram.

Therefore, in order to calculate the variation in phase between the two wave fronts that served to acquire a single interferogram, it is necessary to introduce a "carrier" onto the interferogram. This carrier is obtained by introducing an air wedge between the two wave fronts, that is, by slightly inclining one wave front relative to the other one. This inclination causes a linear variation of the phase along an axis of the image, e.g., x. This has the effect of introducing fringes into the interferogram.

If the object did not move between t0 and t1, the fringes are parallel, perpendicular to the x axis, and equidistant along x. On the other hand, if the object moved between the two exposures, the deformations of these fringes teach us about the deformations undergone by the object observed. An analysis of these deformations can be made in different manners: by Fourier transformation, interpolation of fringes, etc.

The systems used to create the carrier are, e.g., of an electro-optical type or mechanical type by shifting a mirror on the reference beam in the case of interferometry "in real time" or one of the two reference beams in the case of "double-exposure" interferometry. These systems consequently require a control means. These systems are therefore expensive and also have the disadvantage of not being able to be envisaged when the holographic material studied is too thick.

SUMMARY OF THE INVENTION

This invention relates to a process for generating a carrier in an interferogram in an interferometry device either of the "real-time holographic interferometry" type or of the "double-exposure holographic interferometry" type, including recording a first wave front on a hologram and coming from an object, generating a second wave front, wherein the two wave fronts are superposed, orthogonally polarizing the superposed wave fronts, either naturally or by a modification stage, and passing the orthogonally polarized two wave fronts through a birefringent crystal, a polarizer and a detector to make the two wave fronts interfere.

This invention also relates to a device for generating a carrier in an interferogram of the "real-time holographic interferometry" type or of the "double-exposure holographic interferometry" type, including a recorder that records a first wave front coming from an object on a hologram, a second wave front generator, in which two orthogonally polarized wave fronts are superposed, a plurality of lenses, at least one polarizer which the two wave fronts pass, at least one holographic environment, at least one detector of a birefringment crystal through which the two wave fronts pass,

BRIEF DESCRIPTION OF THE DRAWINGS

The invention will be better understood with the aid of the following description given purely by way of explanation, and in the case of "real-time" interferometry, of an embodiment of the invention with reference made to the attached figures.

DETAILED DESCRIPTION

Figure 1:
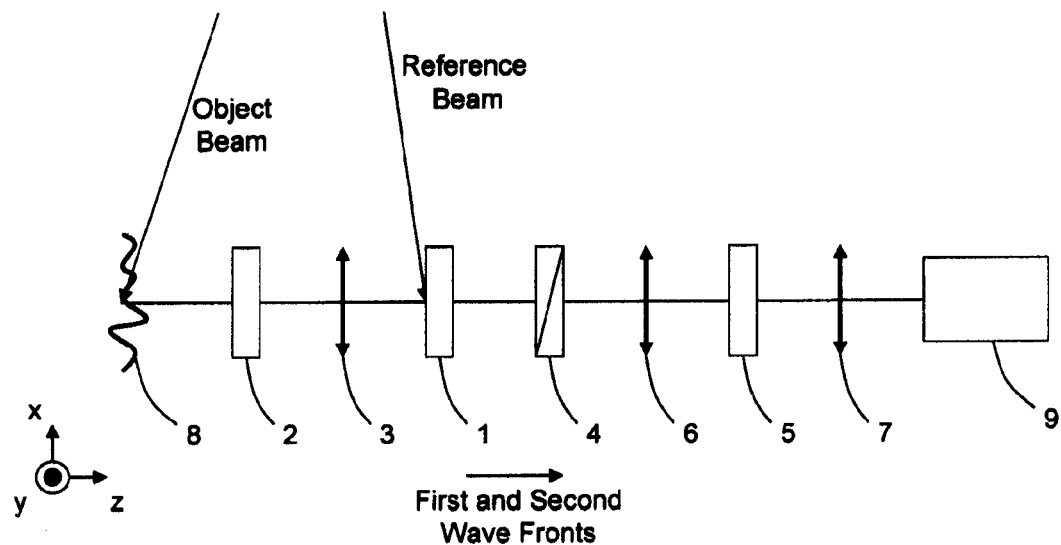
FIG. 1 shows a schematic view of a first aspect of the device in accordance with the invention.

Invention remedies the disavantages of the prior art by providing a system in which no shifting is necessary to generate the carrier. To this end, it provides a process for generating a carrier in an interferogram in an interometry device.

For interometry "in real time," the process comprises a first stage of recording a wave front coming from an object on a hologram. During a second stage, the wave front is restored by readback of the hologram by a reference beam. At the same time, the wave front is superposed on a new wave front coming from the object observed.

For the "double-exposure" interferometry, the process comprises a first stage of recording a wave front coming from an object on a hologram. It also comprises a second stage of recording a new wave front coming from the object on the hologram. The two wave fronts are restored by readback of the hologram by two reference beams and are superposed. Thus, the second wave front is obtained in the case of "double-exposure" interferometry by recording a new wave front coming from the object.

The process is characterized in that the two above-cited wave fronts are polarized orthogonally, either naturally or by a modification stage, and in that it comprises a stage of the passage of these two wave fronts polarized orthogonally through a birefringent crystal, a polarizer and a detector to make the two wave fronts interfere.

According to a first aspect, the modification stage modifies the wave coming from the object or the wave of the reference beam in the case of interferometry "in real time", or one of the two reference beams in the case of "double-exposure" interferometry with an electro-optical switch. This modification of the polarization of one of these waves takes place after recording the hologram.

According to a second aspect that relates to interferometry "in real time" in the case in which polarization is obtained naturally, the holographic material used in the interferometry device is an anisotropic material that permits the processes of anisotropic diffraction, namely, that the polarization of the wave front reconstructed by diffraction of the reference beam on the hologram is orthogonal to the polarization of the reference beam and to that of the beam coming from the object.

The invention also relates to the device for carrying out the process for generating a carrier in an interferogram of the "real-time holographic interferometry" type or of the "double-exposure holographic interferometry" type, comprising a first stage of recording a first wave front coming from an object 8 on a hologram, generation of a second wave front, in which the two wave fronts, polarized orthogonally, are superposed, comprising a plurality of objectives 3, 6, 7 or lenses, at least one polarizer 5, at least one holographic environment 1, and at least one detector 9, comprising a birefringent crystal and the two wave fronts pass through this crystal and the polarizer to make the two wave fronts interfere on the detector.

The device may comprise an electro-optical switch to realize the stage of modifying the wave coming from the object or the reference beam.

The birefringent crystal may be in the form of a birefringent biprism situated in the vicinity of an image plane from the optical viewpoint of the object observed.

The birefringent crystal may be in the form of a birefringent lamina/strip. In this instance, the birefringent lamina is ideally situated at infinity from an optical viewpoint relative to the object observed.

Figure 2:
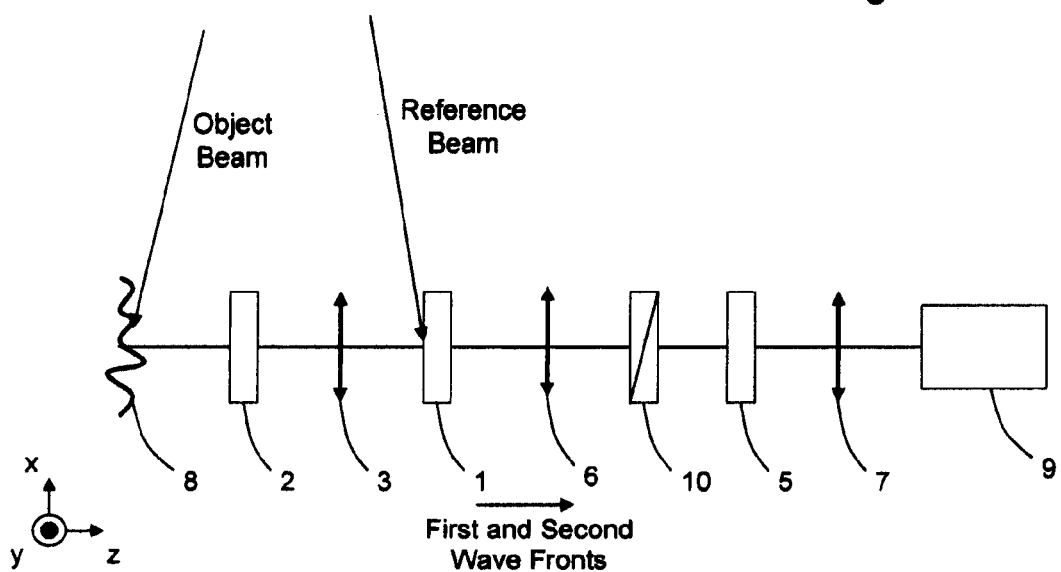
FIG. 2 shows a schematic view of a second aspect of the device.
Figure 3:
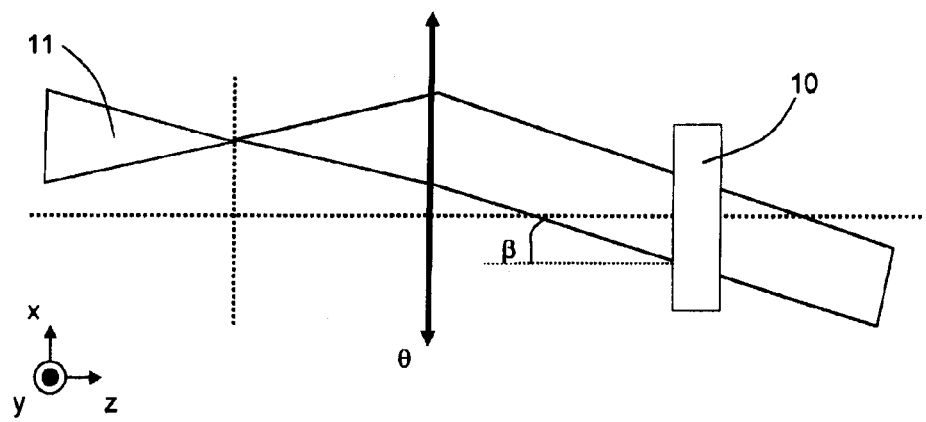
FIG. 3 shows a part of FIG. 2 in a more precise manner.
Figure 4:
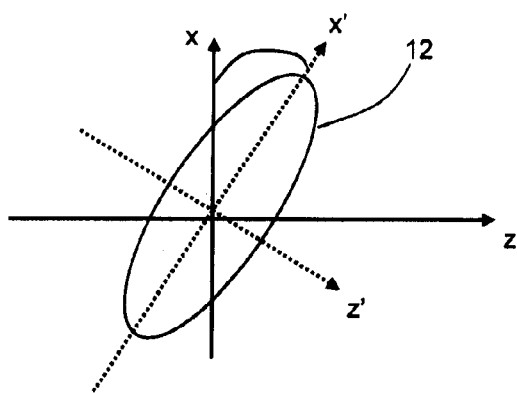
FIG. 4 shows a schematic second of the birefringent lamina used in the second aspect.

A first aspect of the device in accordance with the invention is shown in FIG. 1, whereas a second aspect is shown in and explained with respect to FIGS. 2 to 4. In both instances, introduction of the air wedge between the two wave fronts is obtained by using a birefringent crystal. In these two instances, in order to interfere the two wave fronts polarized orthogonally, the two wave fronts pass through a common polarizer placed between the birefringent crystal and the detector.

In the first aspect, the switch or electro-optical component permitting polarization of one of the wave fronts to be rotated is not shown. Thus, it is supposed that the material of holographic environment 1 used is anisotropic. These anisotropic materials, when they are employed in a configuration of anisotropic diffraction, that are not further described because it is well known, have the consequence that the diffracted beam is polarized orthogonally to the polarization of the beam object. In this instance, the two wave fronts employed to create the interferogram are polarized orthogonally without requiring the use of any electro-optical switch.

In FIG. 1, polarizer 2 has the function of ensuring that the beam incident on holographic environment 1 is well-polarized. The objective, or lens permits the image of the object to be formed in the vicinity of the center of birefringent biprism 4. This biprism 4 is, e.g., a biprism of "Wallaston", of "Rochon" or of "Nomarski", which are well known.

The orthogonal polarization of the two wave fronts are selected in such a manner that they correspond to the two neutral lines of biprism 4. This has the effect of introducing an angle between the wave fronts. The polarizations of the two wave fronts are then projected on the same polarizer 5. The optical system formed by the two lenses 6, 7 permits the image of object 8 to be re-formed on detector 9, in the present instance the detection camera on which the interferogram is formed with the fringes of the carrier. The increment size of the fringes of this carrier is defined by the characteristics of biprism 4.

The separation plane of the bundles should be situated in the vicinity of an image so that the fringes are localized on object 8, which means that biprism 4 should be located in the vicinity of an image of the object observed.

In the second aspect, the various elements present in the first aspect are also present, but instead of using a biprism 4 placed in the vicinity of an image plane of object 8, a birefringent lamella 10 is used that is placed or situated this time at infinity (according to the optical understanding of the term "infinity") relative to the object and the infinity is brought to the focus of lens 6 in FIG. 2.

As illustrated in FIG. 3, each element (pixel) of the images is associated with a light cone 11. In the instance in which the optical pupil is situated at infinity, the axis of the cone is the same for all the pixels of the image and is parallel to the z axis of the assembly.

At infinity, that is, in the plane of birefringent lamina 10, each pixel therefore corresponds to a pencil of parallel light. The angle which this pencil of light forms with the z axis of the assembly is a function solely of the position of the pixel along the x axis.

Birefringent lamina 10, optically uniaxial with the x axis, is cut in such a manner that the optical axis makes an angle $\theta$ with the x axis of the assembly, as shown in FIG. 4, and the optimum is at $\theta=45°$.

In FIG. 4, the x and z axes represent the assembly axes as they appear in FIG. 3. Moreover, x' is the direction of the optical axis and curve 12 represents the ellipsoid of the indices.

Thus, it is possible to show that birefringent lamina 10 introduces an optical delay between the two polarization components, that is, along x and y defined in FIG. 3, which delay is primarily proportional to angle β, therefore proportional to position Xo of the pixel considered. Therefore, a carrier is obtained in the plane of camera 9 whose fringes are parallel to the y axis. The increment size of the carrier is a function of the characteristics of the lamina, its thickness, the birefringence and its cut.

The invention was described above by way of example. It is understood that one skilled in the art is capable of realizing different aspects of the invention without departing from the scope of the invention as defined in the appended claims.

The invention claimed is:

1. A device for generating a carrier in an interferogram of the real-time holographic interferometry type or of the double-exposure holographic interferometry type, comprising:
    a recorder that records a first wave front hologram, by recording interference of an object beam and a reference beam, the object beam diffused by an object and transmitted to a material of holographic environment, and the reference beam transmitted to the material of holographic environment, wherein a first wave front is comprised of the object beam and the reference beam;
    a plurality of lenses through which the first wave front and a second wave front pass, the second wave front comprised of at least an object beam diffused by the object and transmitted to the material of holographic environment at a time later than the object beam of the first wave front;
    a birefringent crystal through which the two wave fronts pass that orthogonally polarizes the two wave fronts;
    at least one common polarizer through which the two wave fronts pass; and
    at least one detector on which an interference between the two wave fronts is formed.

2. The device according to claim 1, wherein the birefringent crystal is in the form of a birefringent biprism.

3. The device according to claim 1, wherein the birefringent crystal is in the form of a birefringent lamina.

4. The device according to claim 3, wherein the birefringent lamina is situated at infinity, from an optical viewpoint, relative to the object observed.

5. The device according to claim 4, wherein the biprism is placed in proximity of an image of the object.

6. A process for generating a carrier in an interferogram in either of a real-time holographic interferometry device or a double-exposure holographic interferometry device, comprising:
    receiving an object beam and a reference beam;
    recording a first wave front hologram by recording interference of the object beam and the reference beam, the object beam diffused by an object and transmitted to a material of holographic environment, and the reference beam transmitted to the material of holographic environment, wherein a first wave front is comprised of the object beam and the reference beam;
    restoring the first wave front by a readback of the first wave front hologram by the reference beam;
    generating a second wave front comprised of at least an object beam diffused by the object and transmitted to the material of holographic environment at a time later than the object beam of the first wave front;
    passing the first and second wave fronts through a birefringent crystal to orthogonally polarize the first and second wave fronts;
    passing the first and second wave fronts through a common polarizer; and
    forming an interference between the first and second wave fronts on a detector.

7. The process according to claim 6, wherein the first wave front is restored in the case of real-time interferometry by readback of the hologram by a reference beam, which first wave front is superimposed on the second wave front coming from the object observed.

8. The process according to claim 6, wherein the second wave front is obtained in the case of double-exposure interferometry by recording a new wave front coming from the object.

9. The process according to claim 6, wherein modifying comprises modification of the wave coming from the object or of the wave of the reference beam in the case of interferometry in real time, or of one of the two reference beams in the case of double-exposure interferometry with an electro-optical switch, which modification of the polarization of one of the waves takes place after recording the hologram.

10. The process according to claim 6, wherein the material of holographic environment used in the interferometry device is an anisotropic material.

* * * * *